United States Patent
Kang et al.

(10) Patent No.: US 11,387,196 B2
(45) Date of Patent: Jul. 12, 2022

(54) ON-CHIP SECURITY CIRCUIT FOR DETECTING AND PROTECTING AGAINST INVASIVE ATTACKS

(71) Applicant: INDUSTRY-ACADEMIC COOPERATION FOUNDATION, YONSEI UNIVERSITY, Seoul (KR)

(72) Inventors: Sungho Kang, Seoul (KR); Young Woo Lee, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 267 days.

(21) Appl. No.: 16/877,100

(22) Filed: May 18, 2020

(65) Prior Publication Data

US 2020/0395315 A1    Dec. 17, 2020

(30) Foreign Application Priority Data

Jun. 11, 2019 (KR) .......................... 10-2019-0068762

(51) Int. Cl.
  *H01L 23/00*   (2006.01)
  *G06F 21/75*   (2013.01)
  *H01L 23/552*  (2006.01)

(52) U.S. Cl.
  CPC ............ *H01L 23/576* (2013.01); *G06F 21/75* (2013.01); *H01L 23/552* (2013.01); *H01L 23/57* (2013.01)

(58) Field of Classification Search
  CPC ...................................................... H01L 23/576
  USPC .......................................................... 257/225
  See application file for complete search history.

(56) References Cited

U.S. PATENT DOCUMENTS

2019/0318136 A1* 10/2019 Martin ..................... G06F 21/87
2020/0043870 A1*  2/2020 Rien ...................... H01L 23/576

FOREIGN PATENT DOCUMENTS

KR    1020080087542 A    10/2008
KR    20170095155 A    8/2017

* cited by examiner

*Primary Examiner* — Ajay Arora

(57) ABSTRACT

The present exemplary embodiments provide a security circuit which senses a micro probe attack by changing both ends of a wire of a shield to be a high impedance state to change a connection state of the wire and analyzing a test signal reflected by the connected wire path, or senses a focused ion beam attack by changing both ends of a wire of a shield to be a high impedance state to change a connection state of the wire and analyzing a test signal which passes through a selected wire for every group, or blocks a physical approach by changing an accessible signal path to be a high impedance state when an external attack is detected by the detection circuit.

19 Claims, 13 Drawing Sheets

[FIG. 1]
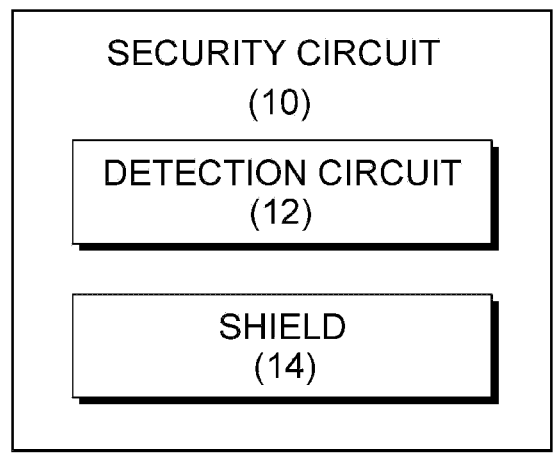
[FIG. 2]
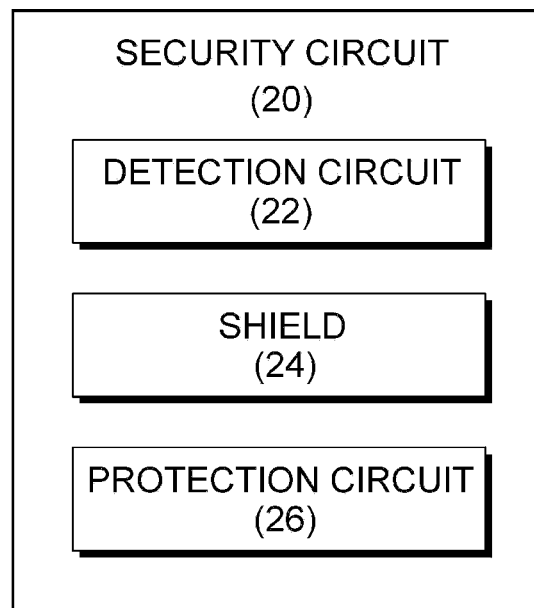

[FIG. 3]
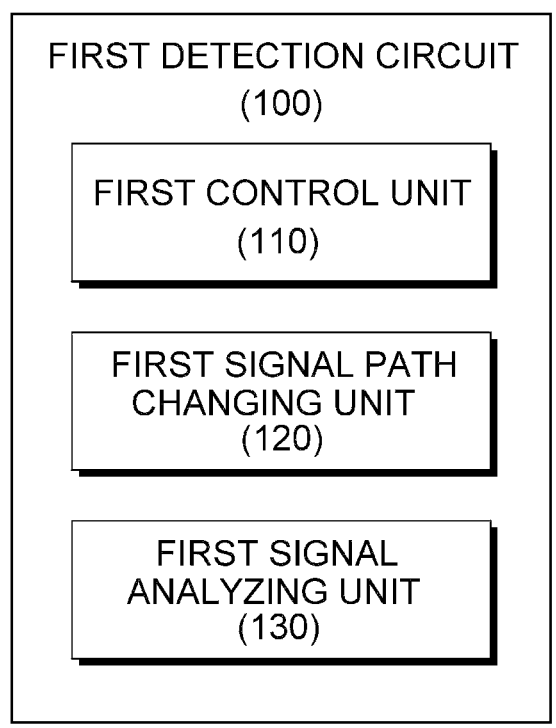

[FIG. 4]
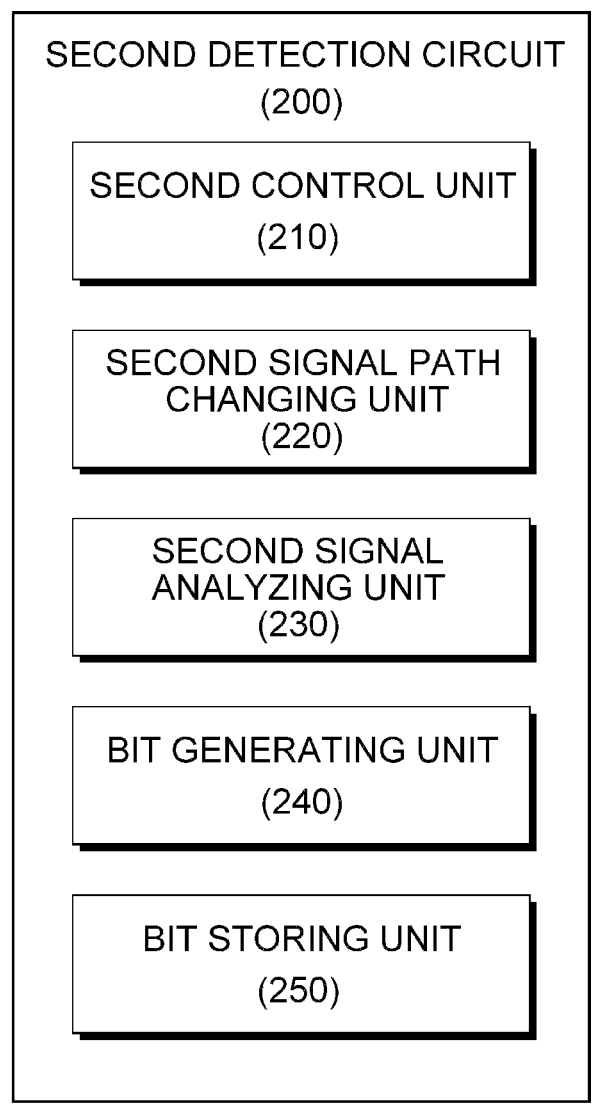

[FIG. 5]
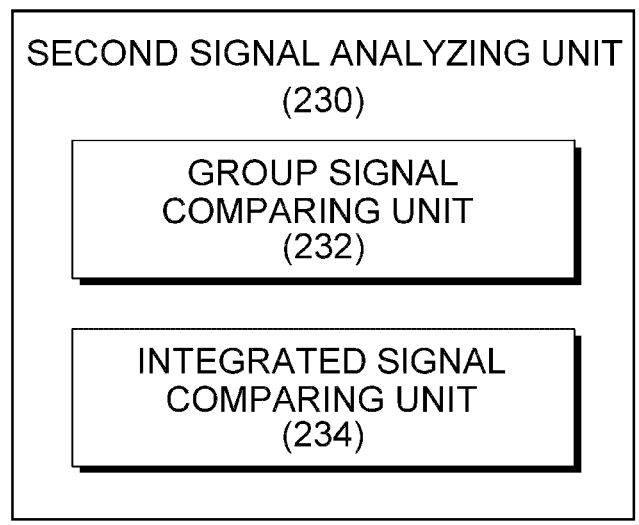
[FIG. 6]
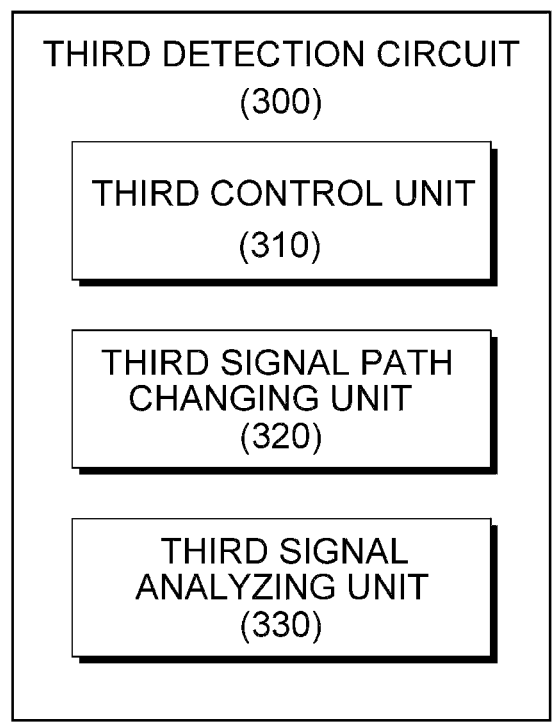

[FIG. 7]
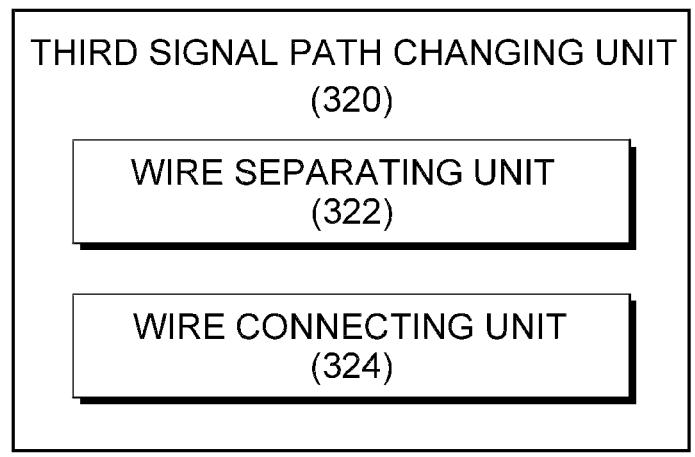

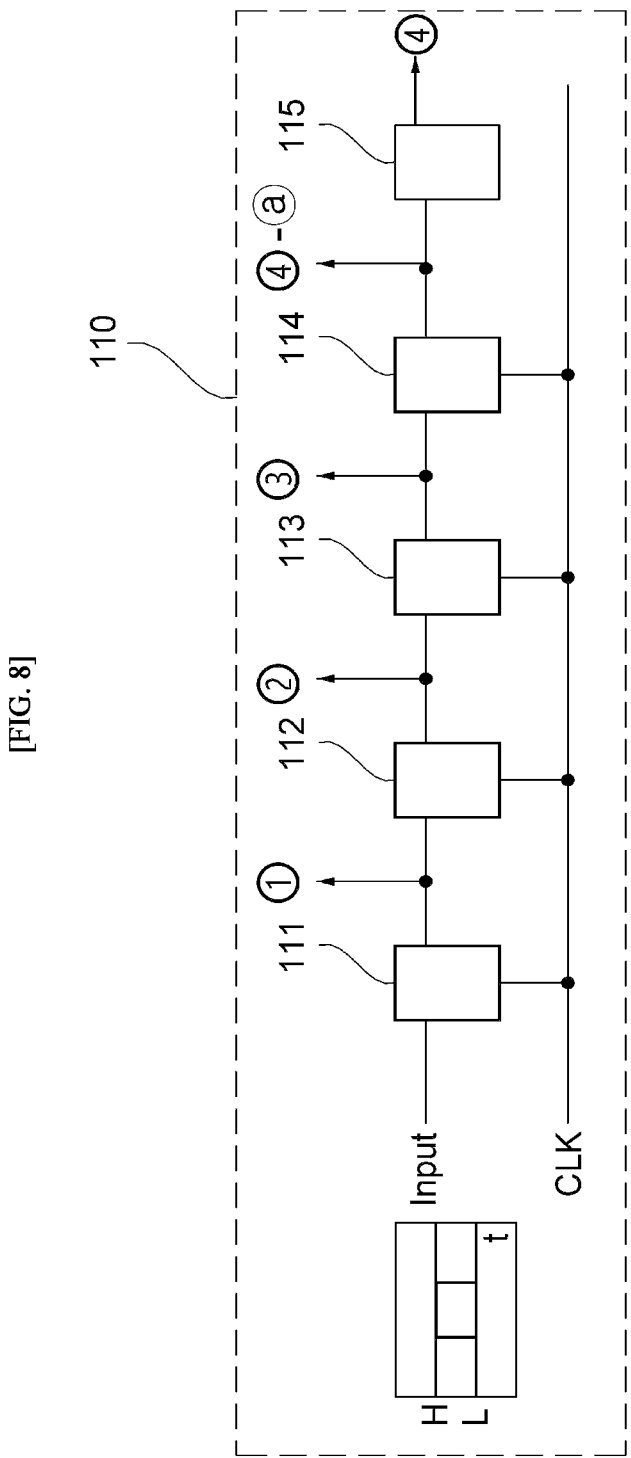
[FIG. 8]

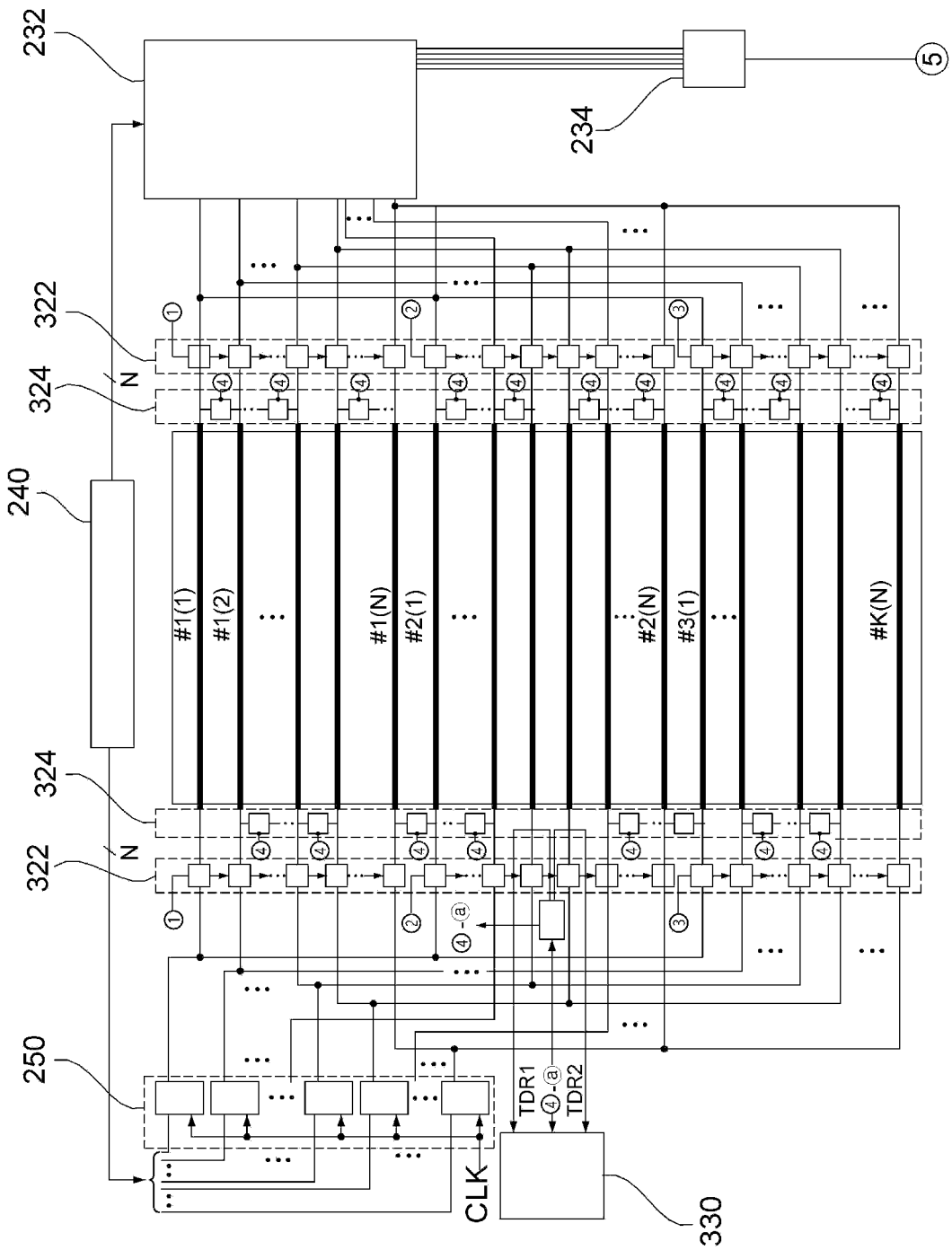

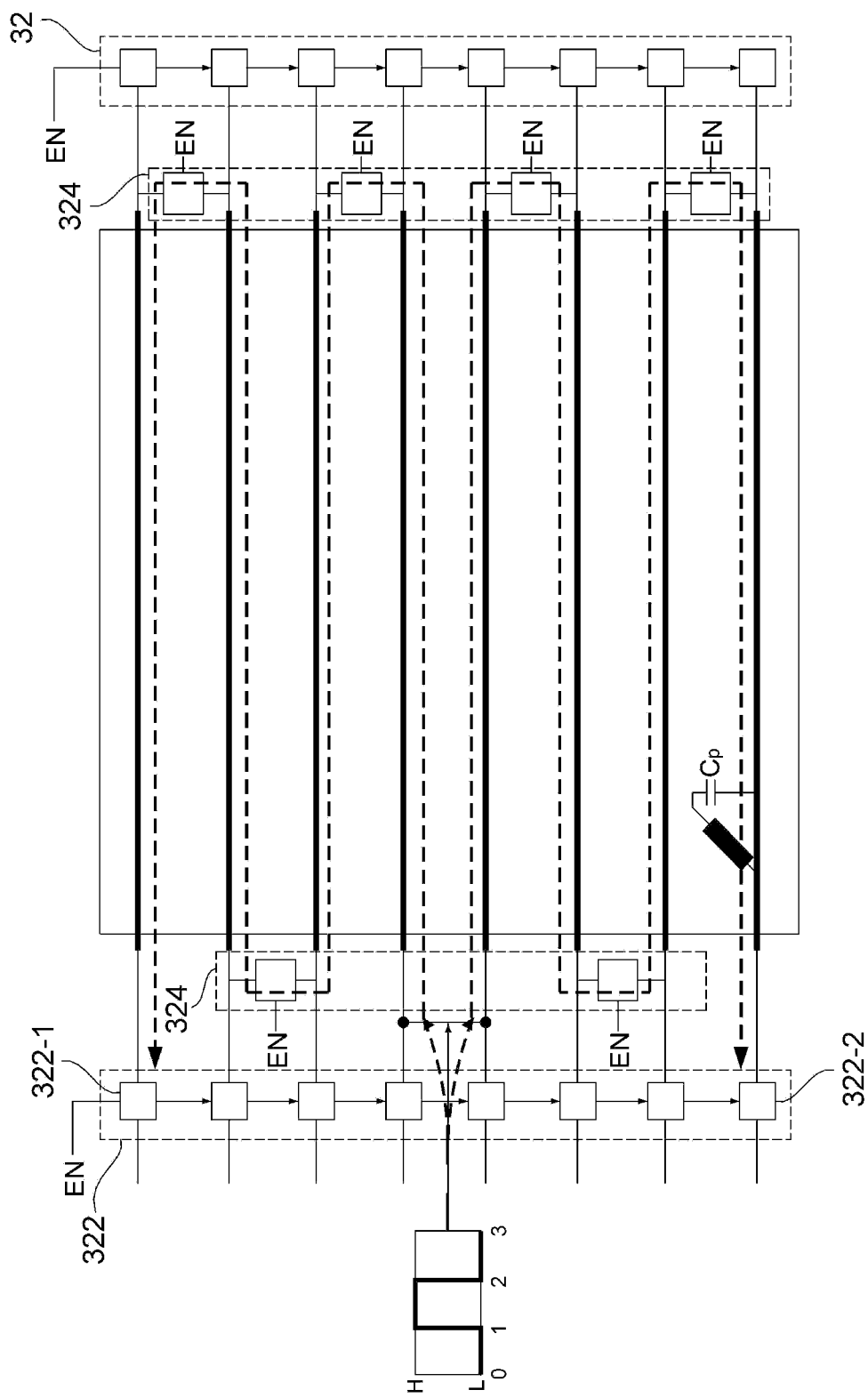
[FIG. 10A]

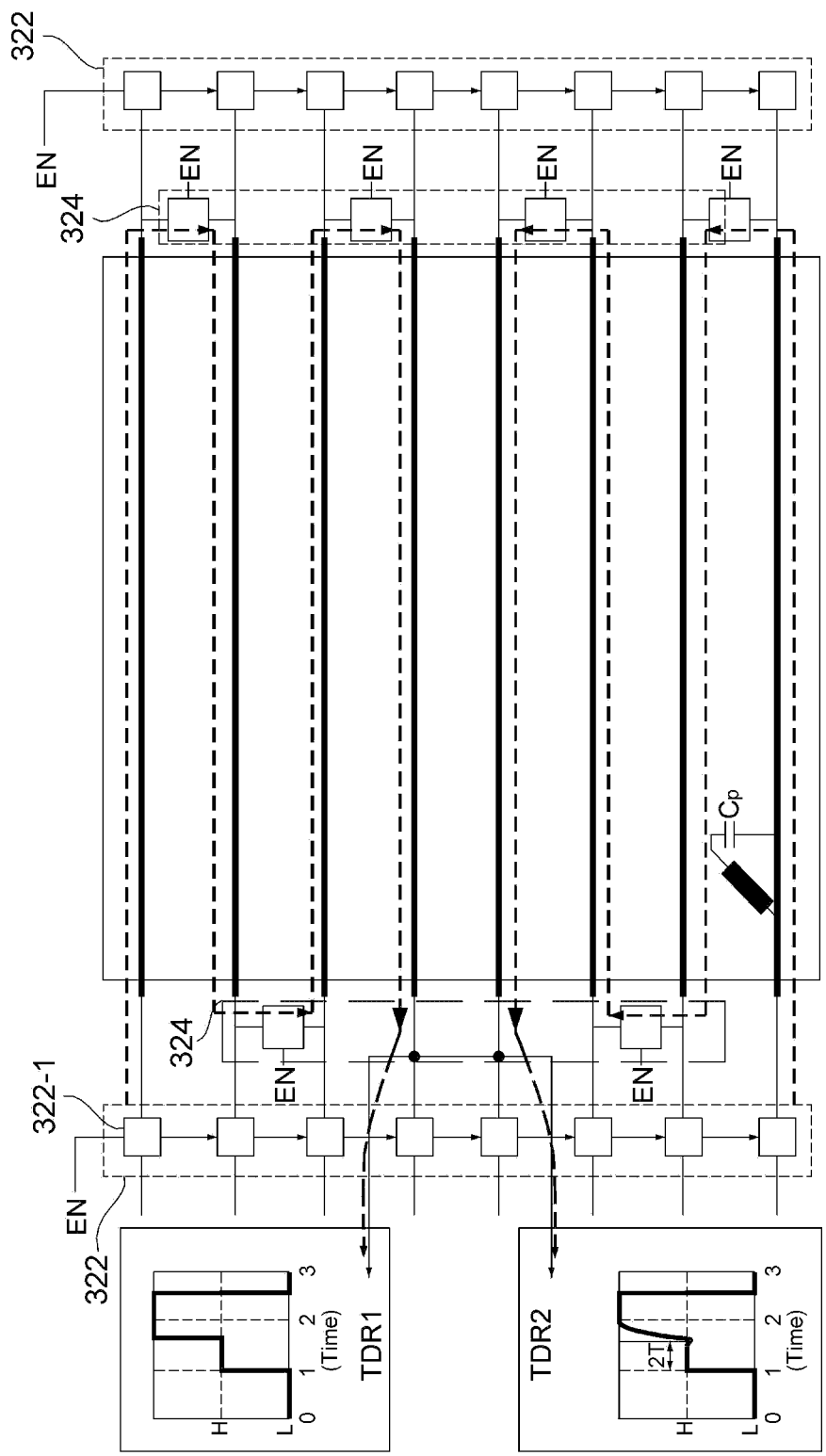

[FIG. 11]
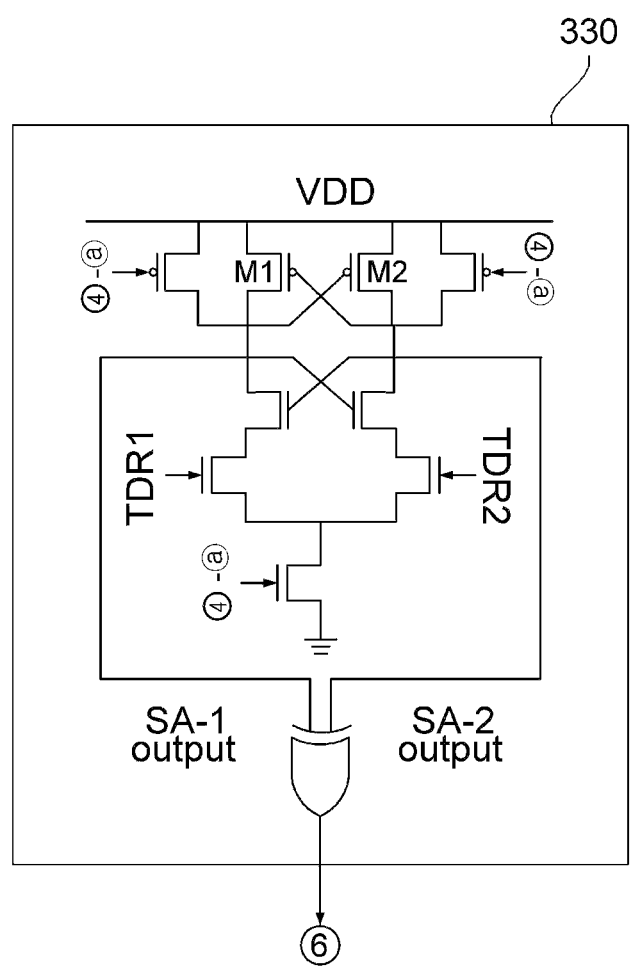

[FIG. 12]
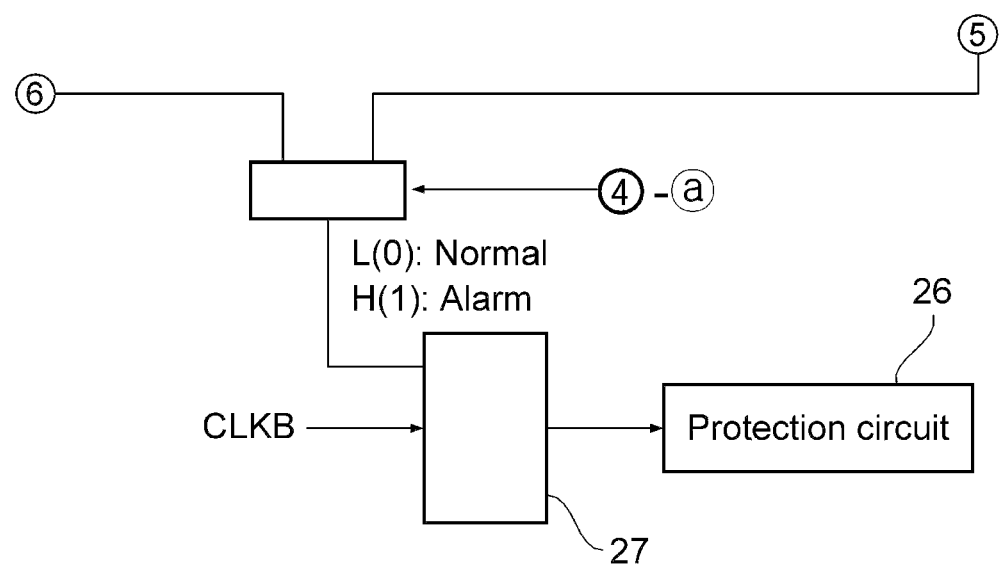

[FIG. 13]
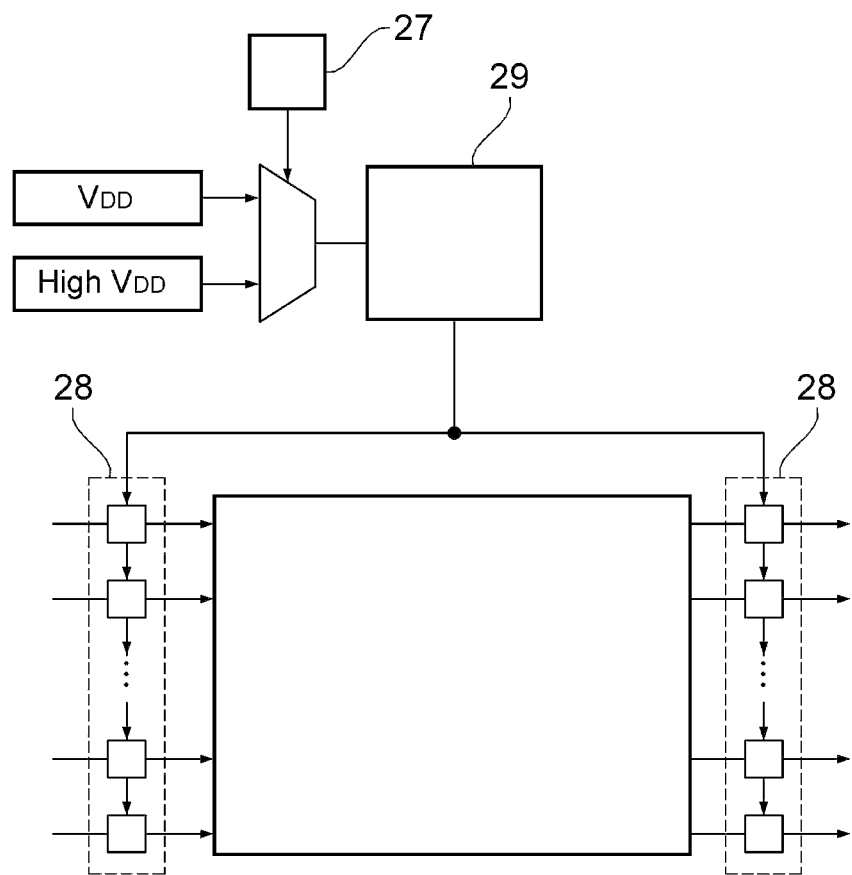

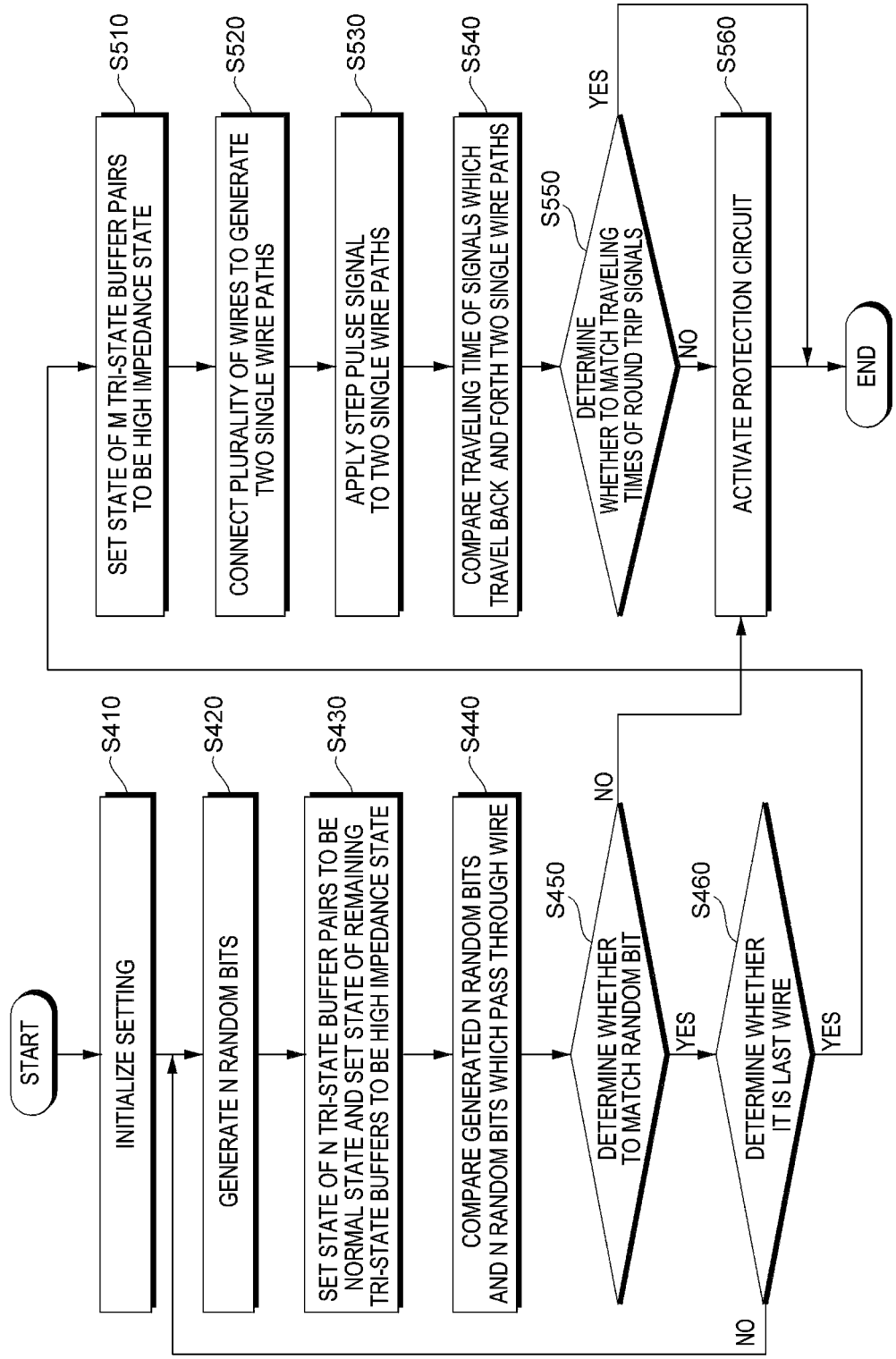

ON-CHIP SECURITY CIRCUIT FOR DETECTING AND PROTECTING AGAINST INVASIVE ATTACKS

CROSS-REFERENCE TO RELATED APPLICATIONS

This application claims priority to and the benefit of Korean Patent Application No. 10-2019-0068762 filed in the Korean Intellectual Property Office on Jun. 11, 2019, the entire contents of which are incorporated herein by reference.

TECHNICAL FIELD

A technical field of the present disclosure relates to a hardware based detection and protection circuit which protects information in a semiconductor chip. This study is related to a semiconductor design technology for improving the robustness of in-memory computing of a mid-size research project supported by the Ministry of Science and ICT (No. 2019R1A2C301107912).

BACKGROUND ART

The contents described in this section merely provide background information on the present exemplary embodiment but do not constitute the related art.

Various physical attacks and software attacks on the semiconductor chip are threads to a product using a system on chip (SoC) or an application service using the same. Attackers perform reverse engineering on an integrated circuit and arbitrarily modify an operation mode of a circuit using acquired information or manipulate data stored in the memory.

Attackers directly access the chip to observe or analyze an internal structure by a physical invasive attack on the semiconductor chip. An attacking method includes a chip modifying method using a focused ion beam (FIB) device and a circuit modifying method using micro probe approach. The focused ion beam attacking method arbitrarily disconnects or connects a metal line using ion beam. The micro probe attacking method reads a status value of a specific metal line.

An invasive attack on a semiconductor chip causes realistic problems of hacking important data or unlocking an access security.

(Patent Document 1) Korean Unexamined Patent Application Publication No. 10-2017-0095155 (published on Aug. 22, 2017)

SUMMARY OF THE INVENTION

A main object of exemplary embodiments of the present disclosure is to detect a physical attack by a security circuit having a variable structure by changing an end of a wire of a shield to be a high impedance state.

Another object of the exemplary embodiments of the present disclosure is to detect a micro probe attack by changing a connection state of a wire by changing both ends of a wire of a shield to be a high impedance state and analyzing a test signal reflected through a connected wire path.

Another object of the exemplary embodiments of the present disclosure is to detect a focused ion beam attack by changing a connection state of a wire by changing both ends of a wire of a shield to be a high impedance state and analyzing a test signal which passes through a wire selected for every group.

Another object of the exemplary embodiments of the present disclosure is to diagnose both a micro probe attack and a focused ion beam attack by sharing and selectively controlling a tri-state buffer which changes both ends of a wire of a shield to be a high impedance state.

Another object of the exemplary embodiments of the present disclosure is to block a physical approach by changing an accessible signal path to be a high impedance state when an external attack is detected by a detection circuit.

Other and further objects of the present disclosure which are not specifically described can be further considered within the scope easily deduced from the following detailed description and the effect.

According to an aspect of the present embodiment, a security circuit includes: a shield which includes M (M is a natural number which is larger than 2) wires and is disposed above a semiconductor chip; and a detection circuit which changes a connection state of the M wires to set a wire path and analyzes a test signal traveling the wire path to detect an external attack, and the detection circuit changes an end of at least one wire of the M wires to be a high impedance state.

According to another aspect of the present embodiment, a security circuit includes: a shield which includes M (M is a natural number which is larger than 2) wires and is disposed above a semiconductor chip; and a detection circuit which changes a connection state of the M wires to set a wire path and analyzes a test signal traveling the wire path to detect an external attack, the detection circuit connects the M wires to generate a plurality of wire paths and changes of an end of the plurality of wire paths to have an impedance value so that the test signal is reflected.

According to another aspect of the present embodiment, a security circuit includes: a shield which includes M (M is a natural number which is larger than 2) wires and is disposed above a semiconductor chip; and a detection circuit which changes a connection state of the M wires to set a wire path and analyzes a test signal traveling the wire path to detect an external attack, and the detection circuit groups the M wires into K wire groups (K is a natural number which is smaller than M) and activates a wire path of a wire group selected from the K wire groups.

According to another aspect of the present embodiment, a security circuit includes: a shield which includes M (M is a natural number which is larger than 2) wires and is disposed above a semiconductor chip; and a detection circuit which changes a connection state of the M wires to set a wire path and analyzes a test signal traveling the wire path to detect an external attack, and the detection circuit changes a high impedance state of the wire path to set a first diagnosis mode which detects a micro probe attack or a second diagnosis mode which detects a focused ion beam attack.

According to another aspect of the present embodiment, a security circuit includes: a detection circuit which analyzes an output signal which passes through a plurality of wires to detect an external attack and a protection circuit which when the detection circuit detects the external attack, changes the signal path connected to a target to be protected to be a high impedance state to block the approach.

As described above, according to the exemplary embodiments of the present disclosure, a micro probe attack may be detected by changing a connection state of a wire by changing both ends of a wire of a shield to be a high impedance state and analyzing a test signal reflected through a connected wire path.

According to the exemplary embodiments of the present disclosure, a focused ion beam attack may be detected by changing a connection state of a wire by changing both ends of a wire of a shield to be a high impedance state and analyzing a test signal which passes through a wire selected for every group.

According to the exemplary embodiments of the present disclosure, both a micro probe attack and a focused ion beam attack may be diagnosed by sharing and selectively controlling a tri-state buffer which changes both ends of a wire of a shield to be a high impedance state.

According to the exemplary embodiments of the present disclosure, a physical approach may be blocked by changing an accessible signal path to be a high impedance state when an external attack is detected by a detection circuit.

Even if the effects are not explicitly mentioned here, the effects described in the following specification which are expected by the technical features of the present disclosure and their potential effects are handled as described in the specification of the present disclosure.

BRIEF DESCRIPTION OF THE DRAWINGS

FIGS. 1 and 2 are block diagrams illustrating security circuits according to exemplary embodiments of the present disclosure;

FIG. 3 is a block diagram illustrating a first detection circuit of a security circuit according to an exemplary embodiment of the present disclosure;

FIGS. 4 and 5 are block diagrams illustrating a second detection circuit of a security circuit according to another exemplary embodiment of the present disclosure;

FIGS. 6 and 7 are block diagrams illustrating a third detection circuit of a security circuit according to another exemplary embodiment of the present disclosure;

FIG. 8 is a circuit diagram illustrating a first control unit of a security circuit according to exemplary embodiments of the present disclosure;

FIG. 9 is a circuit diagram illustrating a first detection circuit and a second detection circuit of a security circuit according to exemplary embodiments of the present disclosure;

FIGS. 10A and 10B are circuit diagrams illustrating a third detection circuit of a security circuit according to exemplary embodiments of the present disclosure;

FIG. 11 is a circuit diagram illustrating a third signal analyzing unit of a security circuit according to exemplary embodiments of the present disclosure;

FIGS. 12 and 13 are circuit diagrams illustrating a protection circuit of a security circuit according to exemplary embodiments of the present disclosure; and FIG. 14 is a flow chart illustrating an operation of a security circuit according to exemplary embodiments of the present disclosure.

DETAILED DESCRIPTION OF THE EMBODIMENT

Hereinafter, in the description of the present disclosure, a detailed description of the related known functions will be omitted if it is determined that the gist of the present disclosure may be unnecessarily blurred as it is obvious to those skilled in the art and some exemplary embodiments of the present disclosure will be described in detail with reference to exemplary drawings.

Various physical attacks and software attacks on semiconductor chips may be a threat in terms of a security or a stability of the semiconductor chips. Specifically, when an attacker accesses a data bus in a semiconductor chip by de-packaging the semiconductor chip, data may be exposed by the hacking so that a structure which is capable of fundamentally blocking data leakage is required.

Attackers perform reverse engineering on an integrated circuit used for an integrated circuit (IC) card and arbitrarily change an operation mode of a circuit using acquired information or manipulate data stored in a memory. The attacks on the semiconductor chip as described above may cause realistic problems of hacking important data or unlocking access security.

The attackers may attack the integrated circuit by avoiding a shield in the integrated circuit using a focused ion beam (FIB) method, a micro probing method, and a forcing method. The FIB method refers to a method of arbitrarily disconnecting or connecting a metal line using ion beam. The micro probing method refers to a method of reading a status value on a specific metal line. Forcing method refers to an attack which disconnects a specific metal line by the FIB method and manipulates data by providing a specific manipulation signal to the disconnected metal line.

FIGS. 1 and 2 are block diagrams illustrating security circuits according to exemplary embodiments of the present disclosure.

As illustrated in FIG. 1, a security circuit 10 includes a detection circuit 12 and a shield 14. As illustrated in FIG. 2, a security circuit 20 includes a detection circuit 22, a shield 24, and a protection circuit 26.

The shield 14 or 24 includes a metal line and is disposed above a processor to protect the processor. The shield 14 or 24 may be implemented as an active shield including a plurality of metal lines.

The detection circuits 12 and 22 share tri-state buffers which change both ends of the wire of the shields 14 and 24 to be a high impedance and selectively change the tri-state buffers to diagnose both the micro probe attack and the focused ion beam attack.

The shields 14 and 24 include M (M is a natural number which is larger than 2) wires and are disposed above a semiconductor chip. The detection circuits 12 and 22 set a wire path by changing a connection state of M wires and analyze a test signal moving along the wire path to detect an external attack. The detection circuits 12 and 22 may set a first diagnosis mode which detects a micro probe attack or a second diagnosis mode which detects a focused ion beam attack by changing a high impedance state of the wire path. The first detection circuit 100 may selectively operate a second detection circuit 200 which detects the focused ion beam attack and a third detection circuit 300 which detects a micro probe attack.

The detection circuit 12, 22 changes both ends of the wire of the shield 14, 24 to a high impedance state to change a connection state of the wire and analyzes a test signal which passes through a wire selected for every group to detect the focused ion beam attack. The shields 14 and 24 include M (M is a natural number which is larger than 2) wires and are disposed above a semiconductor chip. The detection circuits 12 and 22 set a wire path by changing a connection state of M wires and analyze a test signal traveling along the wire path to detect an external attack. The detection circuit 12, 22 groups M wires into K (K is a natural number which is smaller than M) wire groups and activates a wire path of a selected wire group among K wire groups. The second detection circuit 200 detects the focused ion beam attack.

The detection circuit 12, 22 changes both ends of the wire of the shield 14, 24 to a high impedance state to change a connection state of the wire and analyzes a test signal which is reflected by the connected wire to detect the micro probe attack. The shields 14 and 24 include M (M is a natural number which is larger than 2) wires and disposed above a semiconductor chip. The detection circuits 12 and 22 set a wire path by changing a connection state of M wires and analyze a test signal traveling along the wire path to detect an external attack. The detection circuit 12, 22 connects M wires to generate a plurality of wire paths and changes an end of the plurality of wire paths to a high impedance state. The third detection circuit 300 detects the micro probe attack.

When the protection circuit 26 detects an external attack through the detection circuit 22, the protection circuit 26 changes an accessible signal path to a high impedance state to block a physical approach. The detection circuit 22 analyzes an output signal which passes through the plurality of wires to detect an external attack.

FIG. 3 is a block diagram illustrating a first detection circuit of a security circuit according to an exemplary embodiment of the present disclosure.

A first detection circuit 100 includes a first control unit 110, a first signal path changing unit 120, and a first signal analyzing unit 130. The first detection circuit 100 may include a second detection circuit 200 and a third detection circuit 300.

The first control unit 110 transmits a control signal to the first signal path changing unit 120 and the first signal analyzing unit 130. The first signal path changing unit 120 is changed to a high impedance state in accordance with a received control signal to change a connection state of M wires and set a wire path. The first signal analyzing unit 130 is connected to the wire path and analyzes a test signal.

The first control unit 110 (i) transmits a first control signal which operates a first diagnosis mode at a first timing to the first signal path changing unit 120 and (ii) transmits a second control signal which operates a second diagnosis mode at a second timing to the first signal path changing unit 120. The first control unit 110 includes a second control unit 210 and a third control unit 310.

The first signal path changing unit 120 includes a second signal path changing unit 120 and a third signal path changing unit 120 and shares a wire separating unit 322. The first signal path changing unit 120 shares tri-state buffers connected to an input end and an output end of M wires and selects some or all of input ends and output ends of M wires to be a high impedance state in accordance with a first control signal and a second control signal.

The first signal analyzing unit 130 detects whether a signal detected in a first diagnostic mode is abnormal and whether a signal detected in a second diagnostic mode is abnormal. The first signal analyzing unit 130 collectively determines a result detected by the second signal analyzing unit 230 and a result detected by the third signal analyzing unit 330.

FIGS. 4 and 5 are block diagrams illustrating a second detection circuit of a security circuit according to another exemplary embodiment of the present disclosure.

A second detection circuit 200 includes a second control unit 210, a second signal path changing unit 220, a second signal analyzing unit 230, and a bit generating unit 240. The second detection circuit 200 may further include a bit storing unit 250.

The second control unit 210 transmits a control signal to the second signal path changing unit 220, the second signal analyzing unit 230, the bit generating unit 240, and the bit storing unit 250. A step pulse may be applied as a control signal. The second signal path changing unit 220 is changed to a high impedance state in accordance with a received control signal to change a connection state of M wires and set a wire path. The second signal analyzing unit 230 is connected to the wire path and analyzes a test signal.

The second control unit 210 transmits the control signal to some wire groups of K wire groups at a predetermined interval to sequentially activate K wire groups.

The second signal path changing unit 220 includes a wire separating unit 322.

The second signal analyzing unit 230 may include a group signal comparing unit 232 and an integrated signal comparing unit 234. The group signal comparing unit 232 compares a test signal which passes through K wire groups and N bits received from the bit generating unit 240 to determine whether the test signal is abnormal for every group. The integrated signal comparing unit 234 receives a signal from the group signal comparing unit to determine whether at least one of N bits is abnormal.

The bit generating unit 240 randomly generates N bits.

The bit storing unit 250 receives N bits from the bit generating unit 240 and stores N bits. The bit storing unit 250 is connected to K wire groups to provide N bits as a test signal. K wire groups share the bit storing unit 240.

FIGS. 6 and 7 are block diagrams illustrating a third detection circuit of a security circuit according to another exemplary embodiment of the present disclosure.

A third detection circuit 300 includes a third control unit 310, a third signal path changing unit 320, and a third signal analyzing unit 330.

The third control unit 310 transmits a control signal to the third signal path changing unit 320 and the third signal analyzing unit 330. A step pulse may be applied as a control signal. The third signal path changing unit 320 is changed to a high impedance state in accordance with a received control signal to change a connection state of M wires and set a wire path. The third signal analyzing unit 330 is connected to the wire path and analyzes a test signal. A step pulse may be applied as a test signal.

When the third control unit 310 applies a test signal to a plurality of wire paths, the third signal analyzing unit 330 compares a plurality of test signal reflected at ends of the plurality of wire paths to detect a time delay.

The third signal path changing unit 320 includes a wire separating unit 322 and a wire connecting unit 324.

The wire separating unit 322 separates some or all of input ends of M wires from the outside and separates some or all of output ends of M wires from the outside to block the flow of the signal at the input ends and the output ends.

The wire connecting unit 324 connects some of input ends of M wires to each other and connects some of output ends of M wires to each other to form a wire path.

The third signal path changing unit 320 may generate a first wire path and a second wire path having the same capacitance using the wire separating unit 322 and the wire connecting unit 324.

The wire separating unit 322 may be implemented by a tri-state buffer and the wire connecting unit 324 may be implemented by a transmission gate.

The third signal analyzing unit 330 may be implemented by a sense amplifier.

The sense amplifier (i) generates signals with a first amplitude at a timing when the third control unit 310 applies a test signal to the plurality of wire paths and (ii) generates signals with a second amplitude at a timing when a plurality of reflected test signals is applied to compare a difference of signals with a second amplitude and detect the delay of signals. The sense amplifier operates at a threshold value which is set to be larger than the first amplitude and smaller than the second amplitude so as not to compare the signals with the first amplitude.

The third detection circuit 300 increases the number of wires which form a wire path in the shields 14, 24 to reduce a minimum value of a sensible capacitance. When the sensible capacitance is fixed, it is incapacitated by the micro probe attack having a smaller capacitance. The security circuit according to the exemplary embodiment dynamically adjusts a sensible minimum capacitance at an initial design stage to respond to a new probe.

When the probe is contacted, the capacitance of the wire is changed. A condition in which an alarm cannot be generated for a parasitic capacitance Cp of the probe is represented by Equation 1.

$$C_P < \frac{t_{SA_{TDR2}} - t_{SA_{TDR1}} - t_H}{(N_{WIRE} - 1) \times (k_{PMOS} + k_{NMOS}) \times \Omega \times |\Delta N_{PROBE}|} \quad \text{[Equation 1]}$$

$t_{SA_{TDR1}}$ and $t_{SA_{TDR2}}$ are a round trip time which is reflected from two wire paths to be detected. $t_H$ is a predetermined hold time. $N_{wire}$ is the number of original wires in the wire path. $\Omega$ is a resistance of a transistor in accordance with a supplied voltage and a threshold voltage. ($k_{PMOS} + k_{NMOS}$) is a trans resistance in accordance with a residual transistor parameter of a PMOS transistor and an NMOS transistor. $\Delta$NPROBE is the number of probes connected to the wire.

A condition in which an alarm can be generated for a parasitic capacitance Cp of the probe is represented by Equation 2.

$$C_P > \frac{t_{SA_{TDR2}} - t_{SA_{TDR1}} + t_H}{(N_{WIRE} - 1) \times (k_{PMOS} + k_{NMOS}) \times \Omega \times |\Delta N_{PROBE}|} \quad \text{[Equation 2]}$$

Since a parasitic capacitance $C_P$ of the probe is inversely proportion to a value obtained by subtracting 1 from the number of wires, the security circuit according to the present exemplary embodiment may reduce the minimum value of the sensible capacitance by increasing the number of wires which form the wire path.

FIG. 8 is a circuit diagram illustrating a first control unit of a security circuit according to exemplary embodiments of the present disclosure.

Existing methods detect only one attack among the plurality of attacking methods and are vulnerable to the other attacks. The proposed invention may detect two attacking methods to have a small hardware overhead and detect each attack for a short detection time.

The security circuit according to the exemplary embodiment has a shield in which a wire is built in parallel above the metal to protect the chip inside to detect an invasive attack. When it is assumed that the number of wires is M in the shield, it is continuously diagnosed in real time whether there is an invasive attack for M wires.

The first control unit 110 includes a second control unit 210 and a third control unit 310 and applies a step pulse as a control signal. The first control unit 110 selects a detection part and automatically selects a mode.

The first control unit 110 or the second control unit 220 sequentially transmits a control signal which operates the second detection circuit 200 which detects the focused ion beam attack. The first control unit 110 or the second control unit 220 adjusts a time interval of the control signal using a plurality of flip flops 111, 112, 113, and 114 or adjusts a path or a timing of the signal using a transistor 115. ①, ②, and ③ of FIG. 8 are connected to ①, ②, and ③ of FIG. 9. The first control unit 110 or the second control unit 220 transmits control signals corresponding to three wire groups to the wire separating unit 322 through ①, ②, and ③ of FIG. 8.

The first control unit 110 or the third control unit 320 transmits a control signal which operates the third detection circuit 300 which detects the micro probe attack. ④ and ④-ⓐ of FIG. 8 are connected to ④ and ④-ⓐ of FIG. 9. The first control unit 110 or the third control unit 320 transmits the control signal to the first wire path and the second wire path through ④ of FIG. 8 and transmits the control signal to the wire connecting unit 324 and the third signal analyzing unit 330 through ④-ⓐ of FIG. 8.

FIG. 9 is a circuit diagram illustrating a first detection circuit and a second detection circuit of a security circuit according to exemplary embodiments of the present disclosure.

The bit generating unit 240 may be implemented by a block cipher and generates N random bits. The bit storing unit 250 transmits the generated bit to N shared flip flops. The generated N bits may simultaneously monitor N wires. In order to verify M wires, random bits are generated and verified a total of M/N times. N generated bits may minimize the hardware using the shared flip flops.

The bit stored in the bit storing unit 250 passes through the wire through the wire separating unit 322 located at the input end. The group signal comparing unit 232 checks whether the corresponding bit is modified by the wire separating unit 322 located at the output end.

The wire separating unit 322 sequentially activates only N wires using the tri-state buffer at the input end and the output end. The wire separating unit 322 which is implemented by the tri-state buffer is controlled by the first control unit 110 of FIG. 8 or the second control unit 210.

The first control unit 110 or the second control unit 210 selects the wire group through the tri-state buffer and compares desired data using N XOR gates to compare N random bits of the corresponding wire group.

If even one bit among the N random bits is abnormal, the integrated signal comparing unit 234 configured by N input OR gates outputs an alarm signal. For example, logic low (0) means a normal state and logic high (1) means an alarm. ⑤ of FIG. 9 is connected to ⑤ of FIG. 12.

When M wires are sequentially diagnosed, the FIB attack is reverified and the micro proving attack detection is diagnosed by comparing a physical wire length and a signal delay by a time domain reflection (TDR).

FIGS. 10A and 10B are circuit diagrams illustrating a third detection circuit of a security circuit according to exemplary embodiments of the present disclosure.

For the purpose of TDR verification, a plurality of wire areas is divided. For example, in FIG. 10A, two wire areas are illustrated. The chip is divided into two areas and wires of the areas are connected to be long as one wire using the wire separating unit 324. In this case, if necessary, the chip may be divided into any number, other than two. The wire separation unit 324 may be implemented by a transmission gate. When an enable signal is logic high, the transmission gate transmits a signal from the input to the output and when the enable signal is logic low, the transmission gate is in a high impedance state. An operation in accordance with the enable signal may be set to be opposite.

The wire separating unit 322 of all input ends and output ends located at the outside of the shield is set to be a high impedance mode by the first control unit 110 or the third control unit to be completely isolated. The wire separating unit 322 may be implemented by a tri-state buffer. When an enable signal is logic low, the tri-state buffer transmits a signal from the input to the output and when the enable signal is logic high, the tri-state buffer becomes a high impedance state. An operation in accordance with the enable signal may be set to be opposite.

Two wires which are connected by one long wire have the same capacitor and simultaneously apply a step pulse generated in the first control unit 110 or the third control unit 310.

Referring to FIG. 10A, the applied step pulse signal travels along the wire line and meets the tri-state buffer located at both ends 322-1 and 322-2. Referring to FIG. 10B, the tri-state buffer is in the high impedance state so that the signal is reflected to return. When there is no FIB attack or probe attempt, times for the reflected signal to return to a point where the step pulse is applied are necessarily the same for two wires.

FIG. 11 is a circuit diagram illustrating a third signal analyzing unit of a security circuit according to exemplary embodiments of the present disclosure.

The third signal analyzing unit 330 may use a sense amplifier to compare arrival times of two reflected signals. A minute difference between two reflected signals is compared by the sense amplifier.

At a timing when the step pulse is applied, an amplitude which is half the VDD is generated and the same amplitude as the VDD is generated after the time 2T, that is, a time when the signal is reflected to return. A transistor having a high threshold voltage is used as a transistor of an input used for sense amplification so as not to compare the difference of the step pulse which is initially applied, rather than the signal which is reflected to return.

When two reflected signals exactly match, it is divided by a voltage in accordance with an on-resistance of a PMOS and an NMOS in the sense amplifier so that two outputs of the sense amplifier output a high value higher than that of a mid-band. When one of two signals is delayed so that one signal arrives earlier, the output is changed from the logic high to the logic low first. As a result, when the arrival times of two signals are different, one signal outputs logic high and the other one outputs logic low.

Therefore, an alarm signal is output by an alarm unit using an XOR gate at the SA output end. For example, logic low (0) means a normal state and logic high (1) means an alarm. ⑥ of FIG. 11 is connected to ⑥ of FIG. 12.

The TDR verifying method according to the exemplary embodiment compares a physical length of the connected wire so that the FIB attack may be reverified by an encrypted communication based verifying method by generating a random bit which is performed in a previous step and a signal delay due to a minute capacitance change through the probe invasion may be detected.

FIGS. 12 and 13 are circuit diagrams illustrating a protection circuit of a security circuit according to exemplary embodiments of the present disclosure.

When the detection circuit detects a physical attack, the alarm signal generated in the alarm unit is transmitted to the protection circuit 26 via a synchronization unit 27. The synchronization unit 27 is synchronized in accordance with a clock signal and is initialized in accordance with an output signal. A control signal is received through ④-ⓐ of FIG. 8 to operate the protection circuit 26. It is determined whether there are two attacks by ⑥ of FIG. 9 and ⑥ of FIG. 11.

The protection circuit enables a signal path blocking unit which is connected to a target to be protected by an anti-fuse 29. The anti fuse 29 has a structure in which two transistors are connected. The signal path blocking unit 23, for example, the tri-state buffers 28 are connected to a signal path of a target to be protected.

When an alarm signal is generated, the protection circuit 26 controls a signal of a multiplexer to apply a high VDD to an anti-fuse input to blow transistors thereabove.

A control signal of the multiplexer is changed to an initial value to apply VDD with a normal amplitude. When the anti-fuse 29 is blown to be programmed, a high value is always input to the control signal of the tri-state buffer. That is, the high impedance state is maintained to physically block all paths which are accessible to important information. A lower transistor input in the anti-fuse collects a related chip to generate a debugging port if the debugging is necessary. Alternatively, it is connected as an inverse of a VDD or attack alarm generation signal.

FIG. 14 is a flow chart illustrating an operation of a security circuit according to exemplary embodiments of the present disclosure.

A security circuit according to exemplary embodiments of the present disclosure is mainly configured by a detection circuit and a protection circuit. The detection circuit performs a first diagnosis mode which detects an encrypted communication based FIB attack through a block cipher and a second diagnosis mode which reverifies the FIB attack and a micro probing attack by comparing a physical wire length and signal delay through a time domain reflection (TDR).

Environments and conditions required in each diagnosis mode may be implemented using a tri-state buffer and the security circuit shares the tri-state buffer in each diagnosis mode to reduce a hardware overhead.

In step S410, a security circuit initializes a setting. For example, a number of wires for adjusting a capacitance is set.

In step S420, the security circuit generates N random bits in a first diagnosis mode. The bit generating unit 240 generates N random bits.

In step S430, the security circuit sets a state of N tri-state buffer pairs to be a normal state and a state of the remaining tri-state buffer pairs to be a high impedance state. A tri-state buffer of an input end of a wire and a tri-state buffer of an output end form one pair.

In step S440, the security circuit compares generated N random bits and N random bits which pass through the wire to detect a bit error.

In step S450, when the random bit does not match as a comparison result, the security circuit activates the protection circuit in step S560.

In step S460, the security circuit selectively diagnoses a wire group and determines whether it is a last wire. If the wire group is not a last wire, another wire group is diagnosed and if the wire group is a last wire, the mode is changed to a second diagnosis mode.

In step S510, the security circuit sets a state of M tri-state buffer pairs to be a high impedance state. That is, the input end and the output end are separated from the signal line.

In step S520, the security circuit connects a plurality of wires to generate two single wire paths. In step S530, the security circuit applies a step pulse signal to two single wire paths. In step S540, the security circuit compares round-trip times of signals which travel back and forth two signal wire paths.

In step S550, the security circuit determines whether the round trip traveling times of the signals match and if the round trip traveling times of the signals match, ends the second diagnosis mode. If the round trip traveling times of the signals do not match, the security circuit activates the protection circuit in step S560.

A plurality of components included in the security circuit is combined to each other to be implemented by at least one module. The components are connected to a communication path which connects a software module or a hardware module in the apparatus to organically operate between the components. The components communicate with each other using one or more communication buses or signal lines.

The security circuit may be implemented in a logic circuit by hardware, firm ware, software, or a combination thereof or may be implemented using a general purpose or special purpose computer. The device may be implemented using hardwired device, field programmable gate array (FPGA) or application specific integrated circuit (ASIC). Further, the device may be implemented by a system on chip (SoC) including one or more processors and a controller.

The security circuit may be mounted in a computing device provided with a hardware element as a software, a hardware, or a combination thereof. The computing device may refer to various devices including all or some of a communication device for communicating with various devices and wired/wireless communication networks such as a communication modem, a memory which stores data for executing programs, and a microprocessor which executes programs to perform operations and commands.

In FIG. 14, the respective processes are sequentially performed, but this is merely illustrative and those skilled in the art may apply various modifications and changes by changing the order illustrated in FIG. 14 or performing one or more processes in parallel or adding another process without departing from the essential gist of the exemplary embodiment of the present disclosure.

The operation according to the exemplary embodiment of the present disclosure may be implemented as a program command which may be executed by various computers to be recorded in a computer readable medium. The computer readable medium indicates an arbitrary medium which participates to provide a command to a processor for execution. The computer readable medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

What is claimed is:

1. A security circuit, comprising:
    a shield which includes M (M is a natural number which is larger than 2) wires and is disposed above a semiconductor chip; and
    a detection circuit which changes a connection state of the M wires to set a wire path and analyzes a test signal traveling the wire path to detect an external attack,
    wherein the detection circuit changes an end of at least one wire of the M wires to be a high impedance state; and
    wherein the detection circuit connects the M wires to generate a plurality of wire paths and changes an end of the plurality of wire paths to have an impedance value so that the test signal is reflected.

2. The security circuit according to claim 1, wherein the detection circuit includes a control unit which transmits a control signal, a signal path changing unit which is changed to be a high impedance state in accordance with the control signal to change a connection state of the M wires, and a signal analyzing unit which is connected to the wire path and analyzes the test signal, and when the control unit applies a test signal to the plurality of wire paths, the signal analyzing unit compares a plurality of test signals reflected from the end of the plurality of wire path to detect time delay.

3. The security circuit according to claim 2, wherein the signal analyzing unit is implemented by a sense amplifier, and the sense amplifier (i) generates signals with a first amplitude at a timing when the control unit applies a test signal to the plurality of wire paths and (ii) generates signals with a second amplitude at a timing when a plurality of reflected test signals is applied to compare a difference of signals with the second amplitude and detect the delay of signals.

4. The security circuit according to claim 2, wherein the sense amplifier operates at a threshold value which is set to be larger than the first amplitude and smaller than the second amplitude so as not to compare signals with the first amplitude.

5. The security circuit according to claim 2, wherein the signal path changing unit includes:
    a wire separating unit which separates some or all of input ends of the M wires from the outside and separates some or all of output ends of the M wire to block the flow of a signal at the input ends and the output ends and
    a wire connecting unit which connects some of input ends of the M wires to each other and connects some of output ends of the M wires to each other to form a wire path.

6. The security circuit according to claim 5, wherein the signal path changing unit generates a first wire path and a second wire path having the same capacitance using the wire separating unit and the wire connecting unit.

7. The security circuit according to claim 5, wherein the wire separating unit is implemented by a tri-state buffer and the wire connecting unit is implemented by a transmission gate.

8. The security circuit according to claim 1, wherein a minimum value of a sensible capacitance is reduced by increasing the number of wires which form the wire path.

9. The security circuit according to claim 1, wherein the detection circuit changes the wire having the high impedance state to group the M wires into K wire groups (K is a natural number which is smaller than M) and activates a wire path of a wire group selected from the K wire groups.

10. The security circuit according to claim 9, wherein the detection circuit includes: a control unit which transmits a control signal, a signal path changing unit which is changed to be a high impedance state in accordance with the control signal to change a connection state of the M wires, and a signal analyzing unit which is connected to the wire path and analyzes the test signal, and the control unit transmits the control signal to some wire groups of the K wire groups with a predetermined time interval to sequentially activate the K wire groups.

11. The security circuit according to claim 9, wherein the detection circuit includes a bit generating unit which randomly generates N bits (N is a natural number which is smaller than M) and a bit storing unit which receives the N bits from the bit generating unit and stores the N bits, the bit storing unit is connected to the K wire groups to provide the N bits as the test signal, and the K wire groups share the bit storing unit.

12. The security circuit according to claim 11, wherein the signal analyzing unit includes a group signal comparing unit which compares a test signal which passes through the K wire groups and the N bit received from the bit generating unit and determines whether the test signal is abnormal for every group.

13. The security circuit according to claim 12, wherein the signal analyzing unit includes an integrated signal comparing unit which receives a signal from the group signal comparing unit to determine whether at least one of the N bits is abnormal.

14. The security circuit according to claim 1, wherein the detection circuit changes a high impedance state of the wire path to set a first diagnosis mode which detects a micro probe attack or a second diagnosis mode which detects a focused ion beam attack.

15. The security circuit according to claim 14, wherein the detection circuit includes a control unit which transmits a control signal, a signal path changing unit which is changed to be a high impedance state in accordance with the control signal to change a connection state of the M wires, and a signal analyzing unit which is connected to the wire path and analyzes the test signal, and the control unit (i) transmits a first control signal which operates the first diagnosis mode at a first timing to the signal path changing unit and (ii) transmits a second control signal which operates the second diagnosis mode at a second timing to the signal path changing unit.

16. The security circuit according to claim 15, wherein the first signal path changing unit shares tri-state buffers connected to an input end and an output end of the M wires and selects some or all of input ends and output ends of M wires to be a high impedance state in accordance with the first control signal and the second control signal.

17. The security circuit according to claim 14, wherein the signal analyzing unit detects whether a signal detected in the first diagnosis mode has an error and whether a signal detected in the second diagnosis mode has an error.

18. The security circuit according to claim 1, further comprising:
    a protection circuit which when the detection circuit detects the external attack, changes the signal path connected to a target to be protected to be a high impedance state to block the approach.

19. The security circuit according to claim 18, wherein a signal path blocking unit is connected to a signal path of the target to be protected and the protection circuit enables the signal path blocking unit connected to the target to be protected by an anti-fuse manner.

\* \* \* \* \*